(12) United States Patent
Hemmings et al.

(10) Patent No.: US 9,970,744 B2
(45) Date of Patent: May 15, 2018

(54) METHOD FOR OPERATING A COORDINATE MEASURING MACHINE

(71) Applicant: Mitutoyo Corporation, Kanagawa-ken (JP)

(72) Inventors: Scott Ellis Hemmings, Edmonds, WA (US); Andrew Patzwald, Kirkland, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 145 days.

(21) Appl. No.: 15/192,799

(22) Filed: Jun. 24, 2016

(65) Prior Publication Data

US 2017/0370688 A1   Dec. 28, 2017

(51) Int. Cl.
*G01B 5/008* (2006.01)
*G01B 21/04* (2006.01)

(52) U.S. Cl.
CPC .......... *G01B 5/008* (2013.01); *G01B 21/04* (2013.01)

(58) Field of Classification Search
CPC ...................................... G01B 5/008
USPC ........................................ 33/503, 558, 561
See application file for complete search history.

(56) References Cited

U.S. PATENT DOCUMENTS

| 4,780,961 A * | 11/1988 | Shelton ............... G01B 7/002 |
| | | 33/503 |
| 6,131,301 A * | 10/2000 | Sutherland ........... G01B 21/045 |
| | | 33/558 |

| 6,487,785 B1 | 12/2002 | Ritz |
| 6,971,183 B2 | 12/2005 | Brenner et al. |
| 7,478,256 B2 | 1/2009 | Conway et al. |

(Continued)

FOREIGN PATENT DOCUMENTS

| EP | 0 420 416 A2 | 4/1991 |
| EP | 0 506 318 B1 | 8/1995 |
| EP | 2 230 481 A2 | 9/2010 |

OTHER PUBLICATIONS

Extended European Search Report, dated Sep. 14, 2017, for European Application No. 17176098.6-1568, 11 pages.

(Continued)

*Primary Examiner* — Christopher Fulton
(74) *Attorney, Agent, or Firm* — Seed IP Law Group LLP (57) ABSTRACT

A method is disclosed for operating a coordinate measuring machine (CMM) including a CMM control system, a surface scanning probe that measures a workpiece surface by outputting probe workpiece measurements, and a probe measurement timing subsystem. The method comprises: operating the CMM control system to output a measurement synchronization trigger signal at predictable times; operating the probe measurement timing subsystem to determine a pre-trigger lead time that is a fraction of a current duration of a probe workpiece measurement sample period, to initiate a current instance of the probe measurement sample period at the pre-trigger lead time before a next predictable time of the measurement synchronization trigger signal; operating the CMM control system to latch a current set of CMM position coordinate values; and operating the surface scanning probe to output the current instance of the probe workpiece measurement in association with the current set of CMM position coordinate values.

10 Claims, 5 Drawing Sheets

(56) References Cited

U.S. PATENT DOCUMENTS

| | | |
|---|---|---|
| 7,652,275 B2 | 1/2010 | Gladnick |
| 7,821,420 B2 | 10/2010 | Woollett et al. |
| 8,392,740 B2 | 3/2013 | Dewhirst et al. |
| 8,438,746 B2 | 5/2013 | Usui |
| 9,077,513 B2 | 7/2015 | Fritsch |
| 9,803,972 B2* | 10/2017 | Sesko ................ G01B 11/007 |
| 2005/0263727 A1* | 12/2005 | Noda .................... G01B 5/008 |
| | | 250/559.29 |
| 2008/0051927 A1 | 2/2008 | Prestidge et al. |
| 2010/0018069 A1* | 1/2010 | Ould .................. G01B 21/042 |
| | | 33/503 |
| 2017/0370689 A1* | 12/2017 | Hemmings ............ G01B 5/008 |

OTHER PUBLICATIONS

Sesko, "Optical Configuration for Measurement Device," U.S. Appl. No. 14/973,431, filed Dec. 17, 2015, 43 pages.

* cited by examiner

--Prior Art--

METHOD FOR OPERATING A COORDINATE MEASURING MACHINE

BACKGROUND

Technical Field

This disclosure relates to precision metrology, and more particularly to signals in probes used with coordinate measuring machines.

Description of the Related Art

Coordinate measurement machines (CMMs) can obtain measurements of inspected workpieces. One exemplary prior art CMM described in U.S. Pat. No. 8,438,746 (the '746 patent), which is hereby incorporated herein by reference in its entirety, includes a probe for measuring a workpiece, a movement mechanism for moving the probe, and a controller for controlling the movement. CMMs employing mechanical contact probes are also described in U.S. Pat. Nos. 6,971,183 and 6,487,785, which are hereby incorporated herein by reference in their entirety. A CMM including a surface scanning probe is described in U.S. Pat. No. 7,652,275, which is hereby incorporated herein by reference in its entirety. As disclosed therein, a scanning probe such as a mechanical contact probe or a non-contact optical probe may scan across the workpiece surface.

In various CMMs which employ scanning probes, measurement synchronization trigger signals trigger measurements from CMM scales or encoders (e.g., linear and rotary scales or encoders) that track an overall position and orientation of the scanning probe (e.g., its base position) in the machine coordinate system, as well as triggering a local surface measurement from the scanning probe. The scanning probe measurement is in a local coordinate system that is referenced to (or measured relative to) the scanning probe base. It is known that there may be a delay or deviation between the time when a measurement synchronization trigger signal latches the CMM scales and the time related to a signal sample period or timing of the scanning probe. The deviation may arise from signal acquisition delays, signal processing delays (including analog to digital conversion) and signal transmission delays, or the like. When such a timing discrepancy exists, the CMM scale measurement data and the scanning probe measuring data cannot be combined into an accurate measurement. U.S. Pat. No. 8,438,746, (the '746 patent) which is hereby incorporated herein by reference in its entirety, is one prior art reference that describes this problem and various prior art solutions, in detail. As described in the '746 patent, prior art solutions include sending a global trigger signal to all subsystems of a CMM, and/or precisely detecting and calibrating the various delays in the various subsystems, and/or "time stamping" and/or adjusting the measurement data from the various subsystems. The '746 patent also notes that, when the various subsystems include local digital electronics and processing, the limited number of wires available in typical CMM systems may prevent providing a dedicated line or channel for each desired timing signal. Thus, the complexity and/or cost of signal transmission and/or decoding may increase. The '746 patent notes that even after all of the aforementioned problems are addressed, the phase of local clocks in various digital subsystems may disagree within a clock period. The '746 patent discloses providing a synchronization signal in addition to a measurement trigger signal. The synchronization signal is used to phase-synchronize various local clocks. The trigger signal defines the instant for triggering the measured value acquisition by the various subsystems, which then acquire their measurements in a time-quantified manner. However, shortcomings regarding system retrofit compatibility (e.g., for new probes), limited electrical connections for scanning probes (e.g., at articulated probe connection joints), and with regard to processing options in "smart probes", remain in the method disclosed in the '746 patent, as well as other prior art methods of measurement synchronization in a CMM. Further improvements and alternatives for CMM scanning probe measurement data synchronization are desired.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Scanning probes that include local signal processing (which may be characterized as "smart probes"), may include adjustable noise filters and/or measurement averaging or the like, provided in the probe. Related parameters may be adjusted by program instructions that are used to control the CMM and/or the probe. The parameters may be changed (e.g., downloaded to the probe) at any time during the execution of an inspection routine for a workpiece, depending on the required accuracy for measuring a particular feature, for example. When such parameters are changed, the delays or timing deviations outlined previously are inherently affected. In general, it may be desired to retrofit such smart probes onto older host systems that did not anticipate the smart probe features, and therefore lack the capability of adjusting such parameters and/or compensating for such frequently changing timing deviations in a flexible and easy to use manner. Furthermore, host systems may also lack a signal line and/or data transmission protocol which can support a synchronization signal of the type disclosed in the '746 patent, or the like. Therefore, according to principles disclosed herein, it may be desirable to compensate for such timing deviations, including those resulting from intentional parameter changes, in a probe measurement timing subsystem that is easily added to a host CMM. In some embodiments, the probe measurement timing subsystem operations may be divided between circuits internal to the probe and an external circuit connected to the probe. In other embodiments, the probe measurement timing subsystem operations may be implemented entirely in a circuit internal to the probe. A brief summary of such a system and method follows.

A method is disclosed for operating a coordinate measuring machine (CMM) including a CMM control system, a surface scanning probe that measures a workpiece surface by outputting probe workpiece measurements, and a probe measurement timing subsystem. The method comprises: operating the CMM control system to output a measurement synchronization trigger signal at predictable times; operating the probe measurement timing subsystem to determine the predictable times, and to determine a current duration of a probe workpiece measurement sample period during which the surface scanning probe acquires measurement data associated with a single instance of the output probe workpiece measurements; operating the probe measurement timing subsystem to determine a pre-trigger lead time that is a fraction of the current duration of the probe workpiece measurement sample period; operating the probe measurement timing subsystem to initiate a current instance of the probe measurement sample period at the pre-trigger lead time before a next predictable time of the measurement synchronization trigger signal, and to determine an associated current instance of the probe workpiece measurement; operating the CMM control system to output a current measurement synchronization trigger signal at the next predictable time and latching a current set of CMM position coordinate values associated with the current measurement synchronization trigger signal; and operating the surface scanning probe to output the current instance of the probe workpiece measurement at a time associated with the current measurement synchronization trigger signal, such that the CMM control system associates the current instance of the probe workpiece measurement with the current set of CMM position coordinate values.

DETAILED DESCRIPTION

Figure 1:
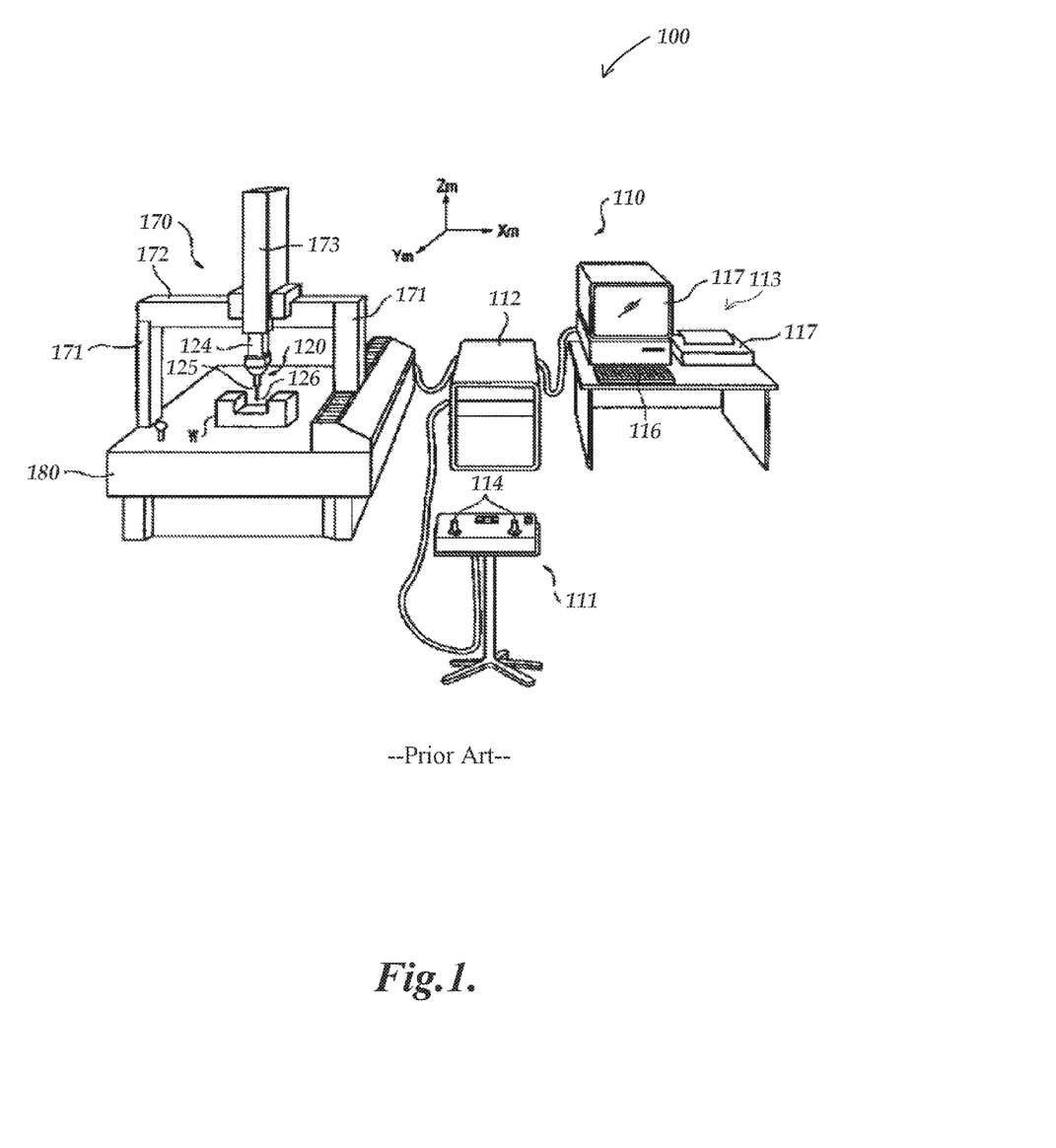
FIG. 1 is a diagram showing various typical components of a CMM.

FIG. 1 is a diagram showing various typical components of a CMM 100. The CMM 100 includes a CMM control system 110, and a surface scanning probe 120. The CMM control system 110 includes an operating unit 111, a motion controller 112 that controls movements of the CMM 100, and a host computer 113. The operating unit 111 is coupled to the motion controller 112 and may include joysticks 114 for manually operating the CMM 100. The host computer 113 is coupled to the motion controller 112 and operates the CMM 100 and processes measurement data for a workpiece W. The host computer 113 includes input means 116 (e.g., a keyboard, etc.) for inputting, for example, measurement conditions, and output means 117 (e.g., a display, printer, etc.) for outputting, for example, measurement results.

The CMM 100 includes a drive mechanism 170 which is located on a surface plate 180, and an attachment portion 124 for attaching the scanning probe 120 to the drive mechanism 170. The drive mechanism 170 includes x-axis, y-axis, and z-axis slide mechanisms 172, 171, and 173, respectively, for moving the scanning probe 120 three-dimensionally. A stylus 125 attached to the end of the scanning probe 120 includes a contact portion 126. The stylus 125 is attached to a stylus suspension portion of the scanning probe 120, which allows the contact portion 126 to freely change its position in three directions when the contact portion 126 moves along a measurement path on the surface of the workpiece W.

Figure 2:
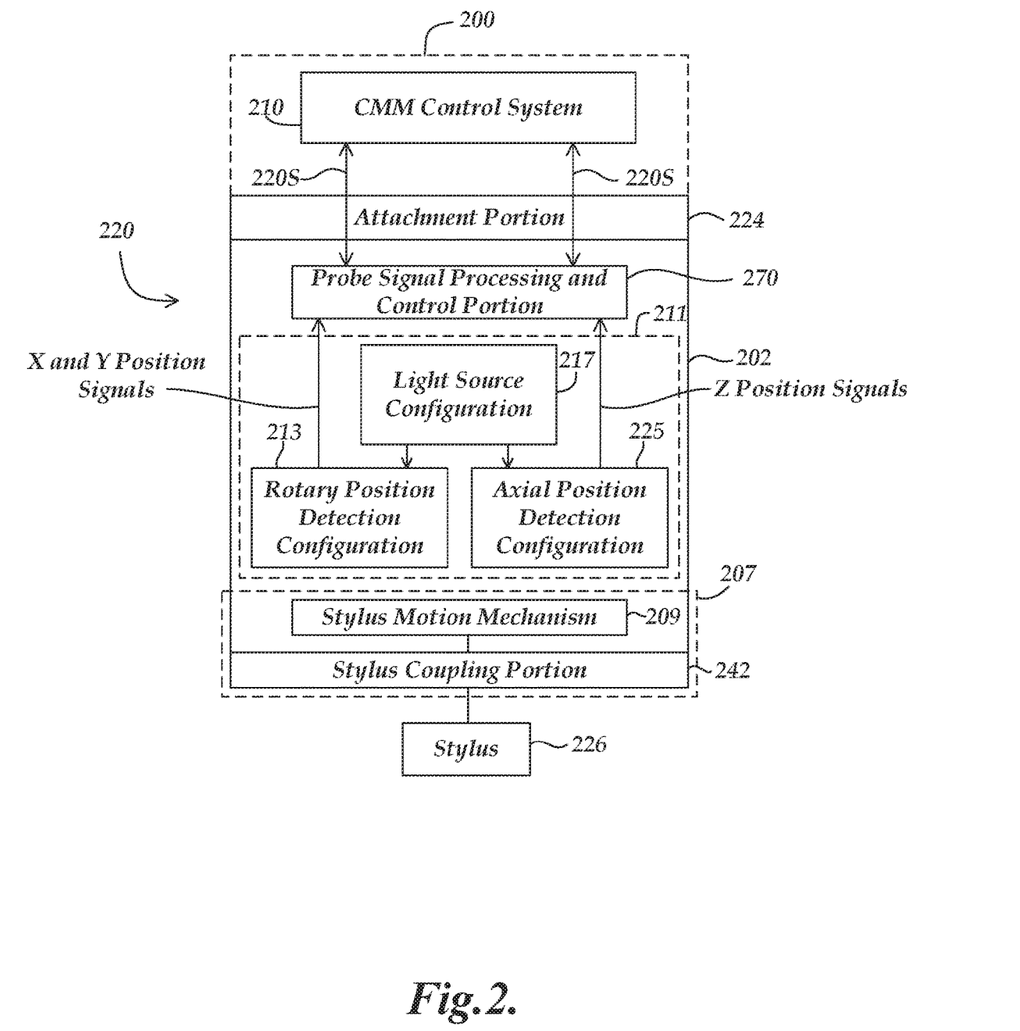
FIG. 2 is a block diagram showing various elements of a scanning probe as coupled to a CMM and providing X, Y and Z position signals.

FIG. 2 is a block diagram showing various elements of a surface scanning probe 220 as coupled to a CMM 200 by an attachment portion 224 and providing X, Y and Z position signals. The CMM 200 includes a CMM control system 210. The scanning probe 220 includes a probe main body 202 which incorporates a stylus suspension portion 207, a stylus position detection portion 211, and a probe signal processing and control portion 270. The stylus suspension portion 207 includes a stylus coupling portion 242 and a stylus motion mechanism 209. The stylus coupling portion 242 is rigidly coupled to a stylus 226. The stylus motion mechanism 209 is configured to enable axial motion of the stylus coupling portion 242 and attached stylus 226 along an axial direction, and to enable rotary motion of the stylus coupling portion 242 and attached stylus 226 about a rotation center. In the implementation shown in FIG. 2, the surface scanning probe 220 is a contact type surface scanning probe that senses a variable amount of deflection of the stylus 226.

As shown in FIG. 2, the stylus position detection portion 211 includes a light source configuration 217, a rotary position detection configuration 213, and an axial position detection configuration 225. The rotary position detection configuration 213 receives light from the light source configuration 217 and outputs X and Y position signals. The axial position detection configuration 225 receives light from the light source configuration 217 and outputs a Z position signal. The probe signal processing and control portion 270 is configured to receive the X, Y and Z position signals and output signals 220S to the CMM control system 210 which are indicative of a 3D position of the stylus coupling portion 242 and/or of the contact portion of the attached stylus 226 as the contact portion moves along a surface of a workpiece W that is being measured. In some implementations, the probe signal processing and control portion 270 may be configured to convert analog X, Y and Z position signals to digital values and average a plurality of samples of X, Y and Z position values in order to provide signals 220S including probe workpiece measurements to the CMM control system 210. The probe signal processing and control portion 270 may also be configured to receive commands from the CMM control system 210 for how to process X, Y and Z position signals.

In some implementations, the stylus position detection portion 211 may be similar to a stylus position detection portion disclosed in U.S. patent application Ser. No. 14/973,431, now U.S. Pat. No. 9,803,972 which is hereby incorporated herein by reference in its entirety. It should be appreciated that stylus detection portion 211 includes optical detection configurations. However, a stylus detection portion employing alternative types of detection configurations may be incorporated in a surface scanning probe suitable for a CMM configured and operated according to the principles disclosed herein. For example, a stylus detection portion may employ electromagnetic deflection sensors (e.g., linear variable differential transformer sensors) or strain gauges.

Figure 3:
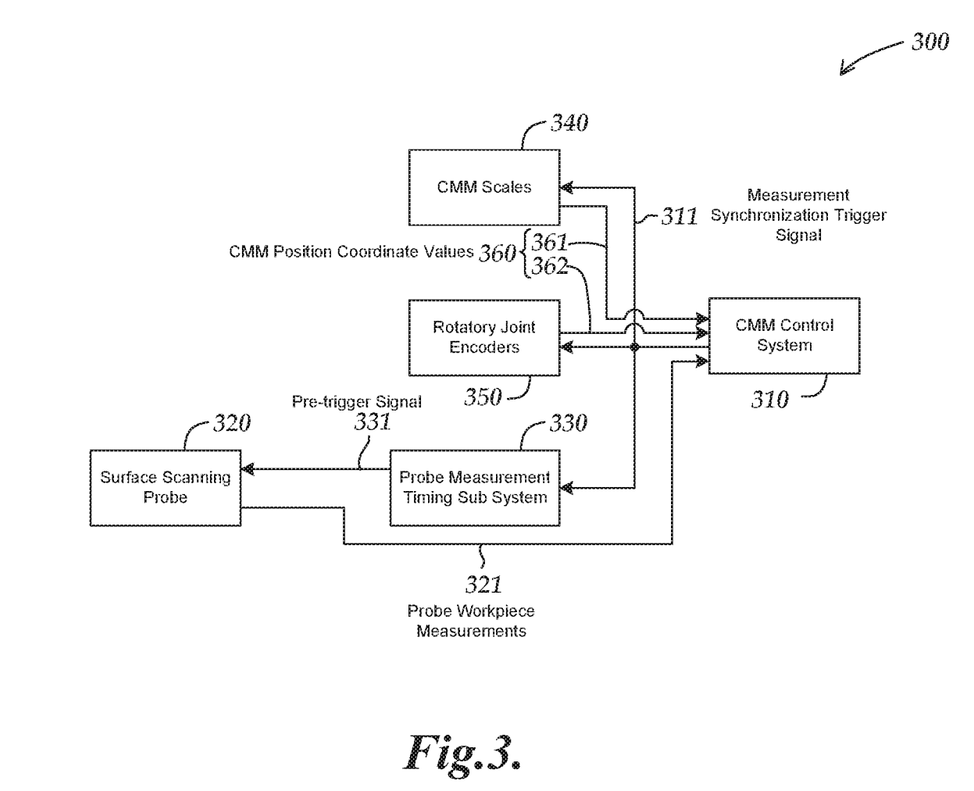
FIG. 3 is a block diagram showing various elements of a CMM.

FIG. 3 is a block diagram showing various elements of a CMM 300. The CMM 300 comprises a CMM control system 310, a surface scanning probe 320 that measures a workpiece surface by outputting probe workpiece measurements 321, a probe measurement timing subsystem 330, CMM scales 340 and rotary joint encoders 350. The CMM control system is operable to output a measurement synchronization trigger signal 311 at predictable times. The probe measurement timing subsystem 330 is operable to determine the predictable times, and to determine a current duration of a probe workpiece measurement sample period during which the surface scanning probe 320 acquires measurement data associated with a single instance of the output probe workpiece measurements 321. The probe measurement timing subsystem 330 is operable to determine a pre-trigger lead time that is a fraction of the current duration of the probe workpiece measurement sample period. The probe measurement timing subsystem 330 is operable to initiate a current instance of the probe workpiece measurement sample period at the pre-trigger lead time before a next predictable time of the measurement synchronization trigger signal 311, and determine an associated current instance of the probe workpiece measurement 321. More specifically, the probe measurement timing subsystem 330 initiates the current instance of the probe workpiece measurement sample period by outputting a pre-trigger signal 331 to the surface scanning probe 320. The CMM control system 310 is operable to output a current measurement synchronization trigger signal 311 at the next predictable time and latch a current set of CMM position coordinate values 360 associated with the current measurement synchronization trigger signal. Each set of the CMM position coordinate values 360 includes CMM scale values 361 from the CMM scales 340 and rotary joint encoder values 362 from the rotary joint encoders 350. The surface scanning probe 320 is operable to output the current instance of the probe workpiece measurement 321 at a time associated with the current measurement synchronization trigger signal, such that the CMM control system 310 associates the current instance of the probe workpiece measurement 321 with the current set of CMM position coordinate values 360.

If a sample period were to begin at the same time as an instance of the measurement synchronization trigger signals 311, a corresponding instance of the probe workpiece measurements 321 would include an error component resulting from a distance the surface scanning probe 320 has moved since the beginning of the sample period. Therefore, the configuration of the CMM 300 and the operating methods described herein are especially suitable at mitigating this error component by initiating the current instance of the probe measurement sample period according to the pre-trigger lead time.

In various implementations, the probe measurement timing subsystem 330 may be located partly or wholly in the surface scanning probe 320. In some implementations, all or part of the probe measurement timing subsystem 330 may be located proximate to the CMM control system 310. In some implementations, the probe measurement timing subsystem 330 may be located in an interchangeable card connected to the CMM control system 310. In some implementations, the interchangeable card may be specifically associated with at least one of the surface scanning probe 320 in particular or a model of the surface scanning probe 320 in particular.

Figure 4:
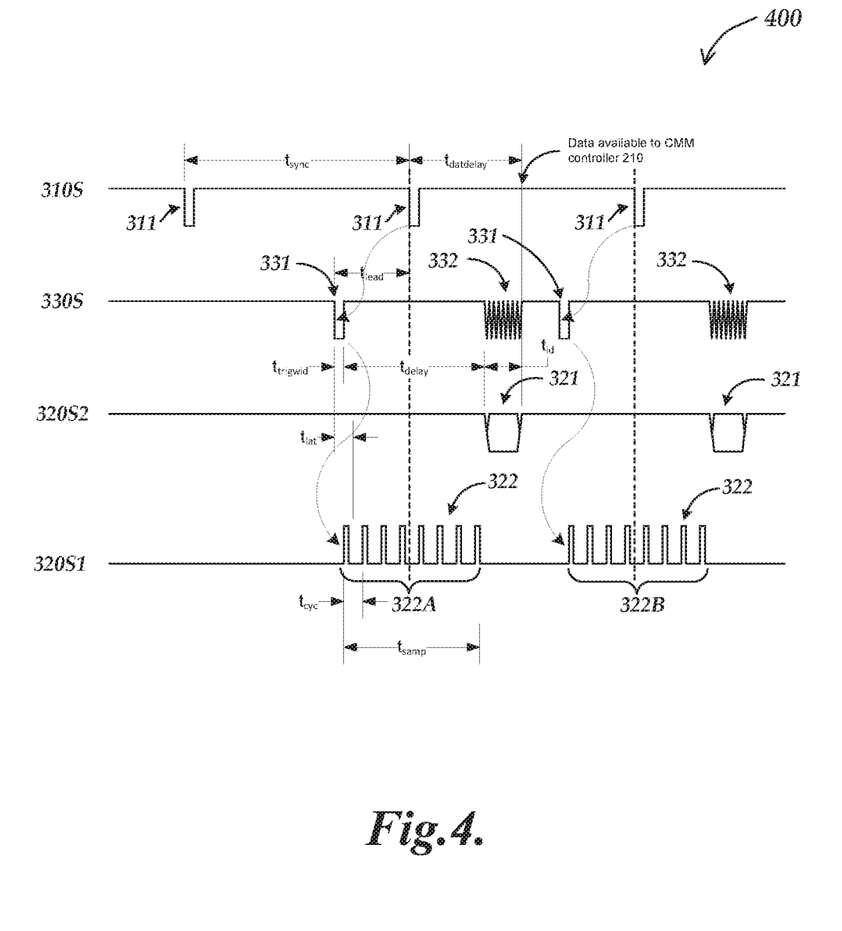
FIG. 4 is a timing diagram showing operations of the CMM of FIG. 3.

FIG. 4 is a timing diagram 400 showing operations of the CMM 300. As shown in FIG. 4, the CMM control system 310 outputs a signal 310S including repeated measurement synchronization trigger signals 311 at a trigger period $t_{sync}$. In some implementations, the trigger period $t_{sync}$ may be in a range of 200 μs to 1,000 μs. As previously described with respect to FIG. 3, the probe measurement timing subsystem 330 initiates the current instance of the probe workpiece measurement sample period (e.g., a sample period 322A or a sample period 322B) by outputting pre-trigger signals 331 to the surface scanning probe 320 through a bidirectional signal communication 330S. The surface scanning probe 320 generates a signal 320S1 including analog to digital conversion (ADC) triggers 322 during probe workpiece measurement sample periods which are initiated in response to the pre-trigger signals 331. The surface scanning probe 320 outputs a signal 320S2 including probe workpiece measurements 321 to the CMM control system 310 based on data sampled during the workpiece measurement sample periods. The probe measurement timing subsystem 330 is also configured to output data clock signals 332 corresponding to the probe workpiece measurements 321 to the CMM control system 310 via the bidirectional signal communication 330S. As previously outlined, the probe measurement timing subsystem 330 may reside partly or wholly in the surface scanning probe 320. In various embodiments, timing or clock signals depicted for the bidirectional signal communication 330S may originate in a portion of the probe measurement timing subsystem 330 located either inside or outside the scanning probe 320.

In some implementations, operating the probe measurement timing subsystem 330 to determine the predictable times may comprise inputting the repeated measurement synchronization trigger signals 311 to the probe measurement timing subsystem 330 at the trigger period $t_{sync}$, and determining a timing of the measurement synchronization trigger signals 311. In some implementations, operating the probe measurement timing subsystem 330 to initiate a current instance of the probe measurement sample period at the pre-trigger lead time before a next predictable time of the measurement synchronization trigger signals 311 may comprise initiating the current instance of the probe measurement sample period at a time after a previous measurement synchronization trigger signal 311 that corresponds to the pre-trigger lead time before the next predictable time of the measurement synchronization trigger signals 311. As shown in FIG. 4, the surface scanning probe 320 acquires measurement data associated with a single instance of the output probe workpiece measurements during a probe workpiece measurement sample period $t_{samp}$. In some implementations, the probe measurement timing subsystem may be operated to determine a pre-trigger lead time $t_{lead}$ that is approximately one half of the current duration of the probe workpiece measurement sample period $t_{samp}$. This results in a measurement synchronization trigger signal 311 which is approximately centered in a sample period (e.g., the sample period 322A or the sample period 322B).

The pre-trigger lead time $t_{lead}$ may be determined as follows. The probe measurement timing subsystem 330 may initiate the current instance of the probe workpiece measurement sample period by outputting a pre-trigger signal 331 to the surface scanning probe 320 at a pre-trigger lead time $t_{lead}$ before the next predictable time of the measurement synchronization trigger signal 311. During a single probe workpiece measurement sample period (e.g., the sample period 322A or the sample period 322B) the surface scanning probe 320 may acquire n samples at a sample timing interval $t_{cyc}$. In the implementation shown in FIG. 4, n is 8. The surface scanning probe 320 may begin an instance of a probe workpiece measurement sample period with a total system latency $t_{lat}$ after an instance of the pre-trigger signals 331. The pre-trigger lead time then be $t_{lead}$ may determined by the expression:

$$t_{lead} = \left(\left(\frac{n}{2}\right) - 1\right)t_{cyc} + t_{lat} + \left(\frac{t_{cyc}}{2}\right). \qquad \text{Eq. (1)}$$

In some implementations, the sample timing interval $t_{cyc}$ may be in a range of 5 μs to 7 μs and the total system latency $t_{lat}$ may be in a range of 1 μs to 2 μs. The pre-trigger lead time $t_{lead}$ may be in a range of 1 μs to 200 μs.

In the implementation shown in FIG. 4, the control system 310 receives the probe workpiece measurements 321 with a data delay $t_{datadelay}$ after the corresponding measurement synchronization signal 311. The surface scanning probe 320 begins outputting the probe workpiece measurements at a time corresponding to a delay $t_{delay}$ after an instance of the pre-trigger signals 331. Each instance of the pre-trigger signals 331 corresponds to a trigger width $t_{trigwid}$ which is the width of the instances of the pre-trigger signals 331. The surface scanning probe 320 outputs the probe workpiece measurements 321 to the CMM control system 310 over a transmission time $t_{id}$. The data delay $t_{datadelay}$ may then be determined by the expression:

$$t_{datadelay} = t_{trigwid} + t_{delay} + t_{id} - t_{lead} \qquad \text{Eq. (2)}.$$

In some implementations, the trigger width $t_{trigwid}$ may be in a range of 200 ns to 300 ns, the delay $t_{delay}$ may be in a range of 5 µs to 350 µs and the transmission time $t_{id}$ may be in a range of 25 µs to 35 µs.

Figure 5:
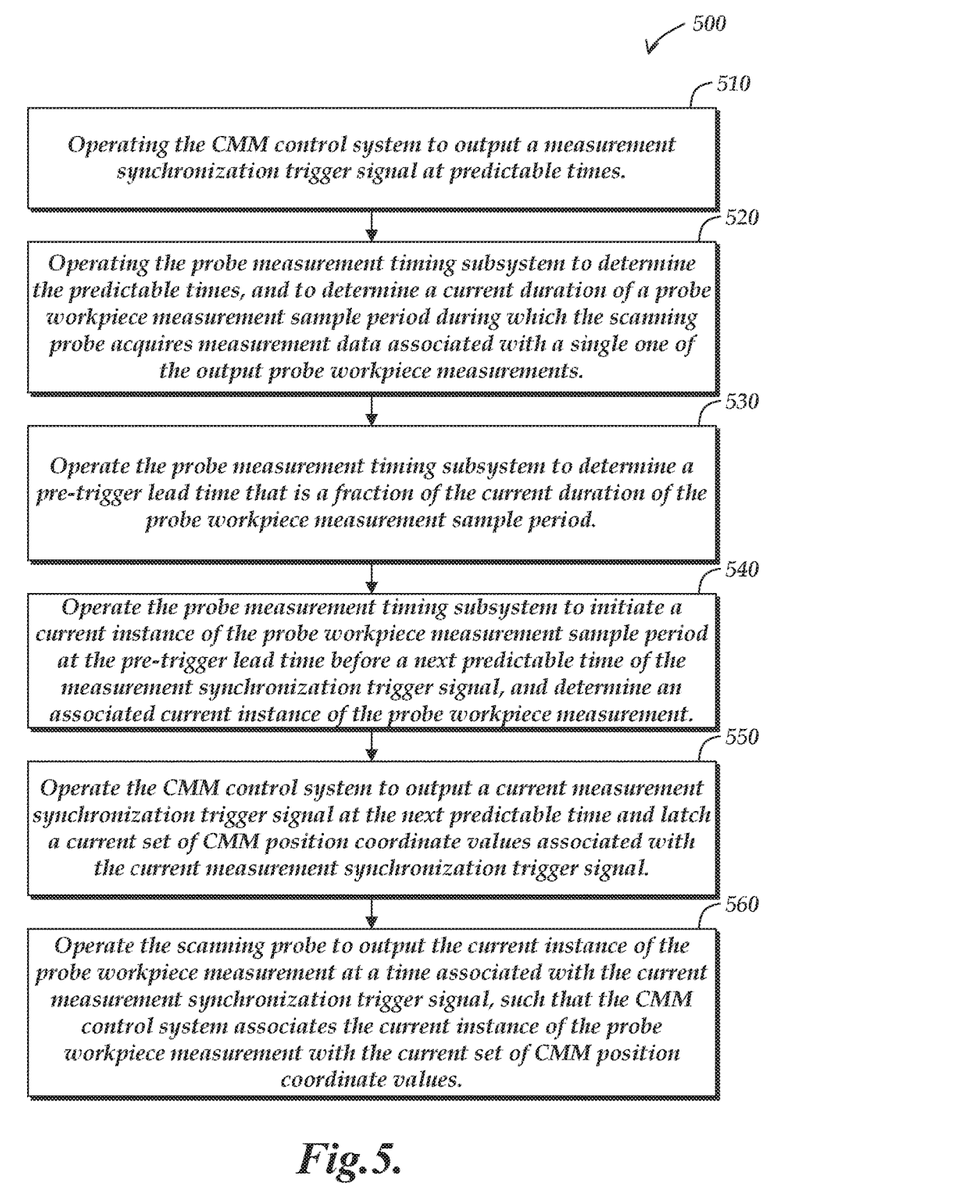
FIG. 5 is a flow diagram showing a method for operating a CMM.

FIG. 5 is a flow diagram 500 showing a method for operating a CMM. The CMM includes a CMM control system, a surface scanning probe that measures a workpiece surface by outputting probe workpiece measurements, and a probe measurement timing subsystem.

At a block 510, the CMM control system is operated to output a measurement synchronization trigger signal at predictable times.

At a block 520, the probe measurement timing subsystem is operated to determine the predictable times, and to determine a current duration of a probe workpiece measurement sample period during which the scanning probe acquires measurement data associated with a single one of the output probe workpiece measurements.

At a block 530, the probe measurement timing subsystem is operated to determine a pre-trigger lead time that is a fraction of the current duration of the probe workpiece measurement sample period.

At a block 540, the probe measurement timing subsystem is operated to initiate a current instance of the probe workpiece measurement sample period at the pre-trigger lead time before a next predictable time of the measurement synchronization trigger signal, and determine an associated current instance of the probe workpiece measurement.

At a block 550, the CMM control system is operated to output a current measurement synchronization trigger signal at the next predictable time and latch a current set of CMM position coordinate values associated with the current measurement synchronization trigger signal.

At a block 560, the scanning probe is operated to output the current instance of the probe workpiece measurement at a time associated with the current measurement synchronization trigger signal, such that the CMM control system associates the current instance of the probe workpiece measurement with the current set of CMM position coordinate values.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A method for operating a coordinate measuring machine (CMM) including a CMM control system, a surface scanning probe that measures a workpiece surface by outputting probe workpiece measurements, and a probe measurement timing subsystem, the method comprising:
    operating the CMM control system to output a measurement synchronization trigger signal at predictable times;
    operating the probe measurement timing subsystem to determine the predictable times, and to determine a current duration of a probe workpiece measurement sample period during which the surface scanning probe acquires measurement data associated with a single instance of the output probe workpiece measurements;
    operating the probe measurement timing subsystem to determine a pre-trigger lead time that is a fraction of the current duration of the probe workpiece measurement sample period;
    operating the probe measurement timing subsystem to initiate a current instance of the probe workpiece measurement sample period at the pre-trigger lead time before a next predictable time of the measurement synchronization trigger signal, and determine an associated current instance of the probe workpiece measurements;
    operating the CMM control system to output a current measurement synchronization trigger signal at the next predictable time and to latch a current set of CMM position coordinate values associated with the current measurement synchronization trigger signal; and
    operating the surface scanning probe to output the current instance of the probe workpiece measurements at a time associated with the current measurement synchronization trigger signal, such that the CMM control system associates the current instance of the probe workpiece measurements with the current set of CMM position coordinate values.

2. The method of claim 1, wherein operating the probe measurement timing subsystem to determine the pre-trigger lead time comprises determining a pre-trigger lead time that is approximately one half of the current duration of the probe workpiece measurement sample period.

3. The method of claim 1, wherein the CMM control system outputs repeated measurement synchronization trigger signals at a trigger frequency, and operating the probe measurement timing subsystem to determine the predictable times comprises inputting the repeated measurement synchronization trigger signals to the probe measurement timing subsystem at the trigger frequency, and determining a timing of the repeated measurement synchronization trigger signals.

4. The method of claim 3, wherein operating the probe measurement timing subsystem to initiate a current instance of the probe measurement sample period at the pre-trigger lead time before the next predictable time of the measurement synchronization trigger signal comprises initiating the current instance of the probe measurement sample period at a time after a previous measurement synchronization trigger signal that corresponds to the pre-trigger lead time before the next predictable time of the measurement synchronization trigger signal.

5. The method of claim 1, wherein the probe measurement timing subsystem is located in the surface scanning probe.

6. The method of claim 1, wherein the probe measurement timing subsystem is located in the CMM control system.

7. The method of claim 6, wherein the probe measurement timing subsystem is located in an interchangeable card in the CMM control system.

8. The method of claim 7, wherein the interchangeable card is specifically associated with at least one of the surface scanning probe in particular or a surface scanning probe model in particular.

9. The method of claim 1, wherein the surface scanning probe is a contact type surface scanning probe that senses a variable amount of deflection of a stylus.

10. The method of claim 1, wherein:
- the probe measurement timing subsystem initiates the current instance of the probe workpiece measurement sample period by outputting a pre-trigger signal to the surface scanning probe at a pre-trigger lead time $t_{lead}$ before the next predictable time of the measurement synchronization trigger signal;
- during a single probe workpiece measurement sample period the surface scanning probe acquires n samples at a sample timing interval $t_{cyc}$;
- the CMM control system receives data from the surface scanning probe with a total system latency $t_{lat}$; and
- the pre-trigger lead time $t_{presynch}$ is determined by the expression:

$$t_{lead} = \left(\left(\frac{n}{2}\right) - 1\right)t_{cyc} + t_{lat} + \left(\frac{t_{cyc}}{2}\right).$$

* * * * *